US010174706B2

(12) United States Patent
Moorcroft

(10) Patent No.: US 10,174,706 B2
(45) Date of Patent: Jan. 8, 2019

(54) METHOD OF INJECTING FUEL INTO AN INTERNAL COMBUSTION ENGINE

(71) Applicant: JAGUAR LAND ROVER LIMITED, Warwickshire (GB)

(72) Inventor: Adam Moorcroft, Coventry (GB)

(73) Assignee: JAGUAR LAND ROVER LIMITED, Whitley, Coventry (GB)

(*) Notice: Subject to any disclaimer, the term of this patent is extended or adjusted under 35 U.S.C. 154(b) by 30 days.

(21) Appl. No.: 15/127,509

(22) PCT Filed: Mar. 20, 2015

(86) PCT No.: PCT/EP2015/055963
§ 371 (c)(1),
(2) Date: Sep. 20, 2016

(87) PCT Pub. No.: WO2015/140309
PCT Pub. Date: Sep. 24, 2015

(65) Prior Publication Data
US 2017/0138293 A1 May 18, 2017

(30) Foreign Application Priority Data
Mar. 21, 2014 (GB) .................................. 1405040.5

(51) Int. Cl.
F02D 41/40 (2006.01)
F02D 41/00 (2006.01)
F02D 41/06 (2006.01)

(52) U.S. Cl.
CPC ......... F02D 41/402 (2013.01); F02D 41/008 (2013.01); F02D 41/0082 (2013.01);
(Continued)

(58) Field of Classification Search
CPC ........ F02D 41/40; F02D 41/402; F02D 41/00; F02D 41/0082; F02D 41/062; F02D 41/401
(Continued)

(56) References Cited

U.S. PATENT DOCUMENTS 5,890,467 A 4/1999 Romzek
6,125,808 A 10/2000 Timewell
(Continued)

FOREIGN PATENT DOCUMENTS

DE 102008046315 A1 3/2010
DE 102011086948 A1 5/2013
(Continued)

OTHER PUBLICATIONS

International Search Report and Written Opinion of the International Searching Authority for International application No. PCT/EP2015/055963 dated Jun. 17, 2015.
(Continued)

Primary Examiner — John Kwon
Assistant Examiner — Johnny H Hoang
(74) Attorney, Agent, or Firm — Carlson, Gaskey & Olds

(57) ABSTRACT

A method is described of injecting fuel into an internal combustion engine. The internal combustion engine utilises direct fuel injection and comprises a plurality of cylinders, each of which has an associated piston. The method comprises simultaneously applying different injection patterns to at least two of the cylinders in dependence on initial positions of their respective pistons. The method comprises injecting a first cylinder of the internal combustion engine according to an optimum injection pattern, and, simultaneously, injecting a second cylinder of the internal combustion engine according to a start-up injection pattern. The start-up injection pattern is determined in dependence on the opti- (Continued)

mum injection pattern and the initial position of the piston associated with said second cylinder.

18 Claims, 7 Drawing Sheets

(52) U.S. Cl.
CPC ......... *F02D 41/062* (2013.01); *F02D 41/401* (2013.01); *F02D 41/065* (2013.01); *Y02T 10/44* (2013.01)

(58) Field of Classification Search
USPC .... 123/179.3, 179.4, 179.16, 491, 295, 299; 701/102–104, 112–114
See application file for complete search history.

(56) References Cited

U.S. PATENT DOCUMENTS

| | | | | |
|---|---|---|---|---|
| 6,378,297 | B1* | 4/2002 | Ito | F02D 41/005 60/284 |
| 7,866,303 | B2* | 1/2011 | Storhok | F02D 41/064 123/478 |
| 2005/0022506 | A1* | 2/2005 | Nishizawa | F01N 3/0842 60/276 |
| 2005/0211194 | A1 | 9/2005 | Hanson et al. | |
| 2008/0092841 | A1 | 4/2008 | Takahashi | |
| 2008/0154484 | A1 | 6/2008 | Takeyama et al. | |
| 2008/0262702 | A1* | 10/2008 | Bamba | F02D 41/009 701/103 |
| 2011/0137543 | A1 | 6/2011 | Gibson et al. | |
| 2011/0144891 | A1 | 6/2011 | Nakamura et al. | |
| 2013/0166178 | A1* | 6/2013 | Cattani | F02D 41/30 701/104 |
| 2014/0297159 | A1* | 10/2014 | Surnilla | F02D 41/3094 701/103 |
| 2015/0027403 | A1* | 1/2015 | Porten | F02D 41/062 123/299 |
| 2015/0167576 | A1* | 6/2015 | Glugla | F02D 41/025 123/295 |
| 2015/0240737 | A1* | 8/2015 | Surnilla | F02D 41/008 123/435 |
| 2016/0025058 | A1* | 1/2016 | Cavanna | F02D 41/3005 123/305 |
| 2016/0169147 | A1* | 6/2016 | Surnilla | F02D 41/2467 123/299 |
| 2016/0341145 | A1* | 11/2016 | Yasuda | F02D 41/068 |
| 2016/0356228 | A1* | 12/2016 | Liu | F02D 41/064 |

FOREIGN PATENT DOCUMENTS

| | | |
|---|---|---|
| EP | 1872005 A1 | 1/2008 |
| GB | 2446691 A | 8/2008 |
| WO | 00/65217 | 11/2000 |
| WO | 2008/107775 A1 | 9/2008 |

OTHER PUBLICATIONS

Combined Search and Examination Report under Sections 17 and 18(3) for Application No. GB1405040.5 dated Oct. 21, 2014.

* cited by examiner

METHOD OF INJECTING FUEL INTO AN INTERNAL COMBUSTION ENGINE

TECHNICAL FIELD

The present invention relates to a method of injecting fuel into an internal combustion engine and to an engine control unit and to a vehicle. The invention finds particular, but not exclusive, application to a vehicle having stop/start functionality in which an internal combustion engine of the vehicle may be automatically stopped and restarted during the course of a drivecycle. By drivecycle is meant a period during which a vehicle is used to undertake a journey, commencing when the driver initiates starting of the vehicle (or 'key on') and ending when the driver initiates shutdown of the vehicle (or 'key off').

BACKGROUND

Control strategies for internal combustion engines utilising fuel injection, such as compression ignition or spark-ignition internal combustion engines, are known in which the timing of fuel injections and the quantity of fuel delivered by each injection is varied in accordance with engine operating conditions. In the case of an internal combustion engine utilising direct fuel injection (DFI), such as a gasoline direct injection (GDI) internal combustion engine, in which fuel is injected directly into the engine cylinders, it is known at 'key on' start, and also for onward driving, to inject fuel according to a fuel injection pattern or strategy which maximises fuel efficiency and minimises emissions of hydrocarbons and soot.

For example, an optimum fuel injection pattern may involve splitting the required fuel into two or three separate injections and delivering these injections into a cylinder during the intake stroke of its respective piston. FIG. 1 is a bar chart showing relative quantities of engine emissions of hydrocarbons and soot resulting from different fuel injection patterns of the prior art. This 'split intake' injection pattern achieves a relatively low level of emissions, as indicated by bar 10 in FIG. 1. This is because the intake stroke is early in the piston cycle so that the injected fuel has time to vaporise before a spark ignites the air/fuel mixture. The splitting of the injections also promotes fuel vaporisation because each one of the smaller quantity injections of fuel can readily vaporise before the next is delivered. Furthermore, good fuel preparation is facilitated by virtue of injection occurring during the turbulent induction phase when the piston is disposed sufficiently far down the cylinder so as to avoid direct fuel to piston impingement, and the fuel has to travel a large distance through turbulent air, which promotes good mixing. This relatively low level of emissions will be appreciated from a comparison of bar 10 with bar 12 of FIG. 1 which represents the higher emissions resulting from a single injection of fuel during the intake stroke.

The amount of emissions resulting from the use of a "split" fuel injection pattern can be reduced further by modulating the amount of air let into each cylinder using a continuously variable valve lift (CVVL). A 'low lift' arrangement of the valve creates a rapid flow of air into the cylinder leading to turbulence which promotes homogenous mixing of the fuel and air inside the cylinder for a more efficient combustion. The reduced emissions resulting from this arrangement are indicated by bar 14 in FIG. 1.

FIG. 2A is a schematic illustration of a split intake injection pattern of the prior art. Referring to FIG. 2A, a full revolution of an engine crankshaft is represented by a circle 20, starting from an uppermost position of a particular engine piston (the top of the circle 20) and moving through intake and compression strokes (clockwise around the circle 20), back to the uppermost position. In FIG. 2A, the relative positions of four pistons, labelled A, B, C and D are shown, each piston position being 90° apart, respectively. The right hand side of the circle 20 represents the intake stroke and the left hand side represents the compression stroke. Thus, when cylinder D is in the induction stroke, cylinder A is in the compression stroke prior to "sparking" at top dead centre (TDC). As shown, fuel is delivered in first, second and third injections 22, 24 and 26, during the intake stroke of the piston.

Although a split intake injection pattern generates low emissions, there is a disadvantage to using such an injection strategy when starting the engine, for example during an eco-start when rapid starting of the engine is required. By eco start is meant the restarting of a vehicle engine after the vehicle has automatically stopped the engine during the course of a drivecycle to save fuel when conditions permit. For example, a vehicle may be arranged to adopt an eco stop condition when a driver-operated brake pedal of the vehicle is depressed and the vehicle is stationary. When the driver releases the brake pedal the engine may be restarted and a transmission of the vehicle may be re-engaged. That is, release of the brake pedal by the driver triggers the engine to be restarted, the driveline to be closed and torque to be transmitted to the drive wheels. However, restarting the engine from an eco stop condition should not cause nuisance to the driver and there should be no appreciable delay in the reapplication of torque to the drive wheels. As a result, there is a requirement for an engine to be started rapidly during eco start. In the context of the present application, an eco-stop/start functionality may also be provided when a vehicle is moving, for example, in a hybrid vehicle in which the internal combustion engine may be stopped and re-started as required when the vehicle is not stationary.

To provide a rapid start, it is known to instead apply a compression injection pattern during a start-up phase of the engine. FIG. 2B is a schematic illustration of a compression injection pattern of the prior art. As shown in FIG. 2B, a single injection of fuel 28 may be provided late in the compression stroke to each engine cylinder, shortly before an ignition spark. Although this strategy provides the rapid start required for an eco-start, the start-up phase itself is associated with high emissions as it relies on a compression injection pattern. The high emissions associated with a compression injection pattern are illustrated by bar 16 in FIG. 1. This can be readily compared with the lower emissions associated with single intake, split intake and split low lift intake injection patterns as indicated by the bars 12, 10 and 14, respectively. The increased emissions associated with the compression injection pattern are a consequence of the necessity of the late timing required to combust the cylinder in the compression stroke in order to meet the desired short eco-start time. It is an object of the present invention to substantially overcome and/or mitigate at least some of the problems described above.

SUMMARY OF THE INVENTION

According to one aspect of the present invention, there is provided a method of injecting fuel into an internal combustion engine comprising a plurality of cylinders, each of which has an associated piston, the method comprising simultaneously applying different injection patterns to at least two of the cylinders in dependence on the initial positions of their respective pistons.

Thus, embodiments of the invention may be said to have resulted from the appreciation that fixing the injection pattern during the start-up phase for all cylinders leads to unnecessary use of compression injection on cylinders later in the engine cycle which, prior to cranking, were positioned so as to be able to receive fuel in accordance with an optimal, e.g. spilt, injection timing pattern if the engine controller allowed it. Expressed differently, the invention may be said to reside in the appreciation that a hybrid approach can be used in which different cylinders of an internal combustion engine may be caused to adopt different injection patterns during the start-up phase of the engine so that, where possible, an optimum injection pattern is always targeted for reducing emissions. Thus, during a predetermined period, for example one revolution of the crankshaft, a first injection pattern is applied to one or more cylinders and a second injection pattern is applied to at least one other cylinder.

The application of different injection patterns to different cylinders enables an appropriate injection pattern to be selected for one of the cylinders based on where in the combustion cycle that cylinder starts. If the cylinder is early enough in the cycle, an optimum injection pattern is adopted. If the cylinder is not early enough in the cycle for adoption of the optimum injection pattern, an alternative injection pattern is adopted for providing a rapid start at the expense of higher emissions. As a result, performance of the engine as a whole can be optimised to provide a rapid start with reduced emissions. This is achieved by optimising the performance of each individual cylinder by selecting the most appropriate injection pattern for that cylinder based on its initial position in the cycle.

The internal combustion engine utilises direct fuel injection. Advantageously, a system in which fuel is injected directly into the cylinders allows for fuel injections to occur during both the intake and compression strokes. It is thus possible to apply an appropriate injection pattern to any cylinder positioned in the intake stroke or the compression stroke, utilising a larger portion of the engine cycle to initiate engine start, and therefore a larger number of the cylinders, than would be possible in an internal combustion engine utilising port fuel injection (PFI), for example.

The method may comprise injecting a first cylinder of the internal combustion engine according to an optimum injection pattern and, simultaneously, injecting a second cylinder of the internal combustion engine according to a start-up injection pattern.

The start-up injection pattern may be determined in dependence on the optimum injection pattern and the initial position of the piston associated with said second cylinder.

This enables an optimum injection pattern to be implemented where possible, for example to reduce emissions, whilst at the same time using one or more start-up injection patterns in other cylinders to enable the engine to generate power rapidly.

The method may comprise transitioning said second cylinder from the start-up injection pattern to the optimum injection pattern within one revolution of a crankshaft of the engine.

The method may comprise determining, from among the plurality of cylinders, a group of first cylinders comprising one or more cylinders and a group of second cylinders comprising one or more cylinders, wherein determining the respective groups of first and second cylinders is performed in dependence on an initial position of the piston associated with each respective cylinder. The method may comprise injecting each of the second cylinders according to a start-up injection pattern, the start-up injection pattern being determined for each respective second cylinder in dependence on the initial position of the piston associated with each second cylinder respectively.

The start-up injection pattern may thus be tailored to that particular cylinder for reducing emissions whilst still achieving a rapid start.

The start-up injection pattern of the or each second cylinder may comprise at least one late injection of missed fuel. Following the at least one late injection of missed fuel, the start-up injection pattern of the or each second cylinder may further comprise delivering at least one injection corresponding to an injection of the optimum injection pattern.

An optimum injection pattern is thus targeted where possible, whilst permitting a concession for cylinders that have missed the first injection of the optimum injection pattern, thus allowing those cylinders to receive their missed fuel late.

The missed fuel may be delivered by a plurality of separate injections. This is suitable if, for example, more than one injection of the optimum injection pattern has been missed.

If an amount of fuel is injected late, the amount may be reduced in dependence on how late it is injected. This advantageously reduces unwanted emissions.

An amount of missed fuel may be determined in dependence on an amount of fuel associated with the optimum injection pattern.

According to a further aspect of the invention, there is provided a method of starting an internal combustion engine including injecting fuel according to the above-described method of injecting fuel into an internal combustion engine.

The method may include delivering injections of fuel to more than one of the cylinders during initial engine cranking or when the engine is stationary. In both of these cases, the delivering of injections of fuel to more than one of the cylinders may comprise delivering injections of fuel to more than one of the cylinders substantially simultaneously. This may be possible providing there are no software or electronic hardware constraints. The internal combustion engine may be started from an eco stop condition.

According to a further aspect of the invention, there is provided a method of reinstating fuel into an internal combustion engine comprising injecting fuel according to the above-described method of injecting fuel into an internal combustion engine. For example, such a method may be employed following an engine deceleration fuel cut. The method may comprise delivering fuel injections substantially simultaneously to more than one of the cylinders of the internal combustion engine.

In another aspect of the invention there is provided an engine control unit operable to control the injection of fuel in an internal combustion engine in accordance with any of the above-described methods.

In a further aspect of the invention there is provided a vehicle comprising an internal combustion engine and the engine control unit.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

Embodiments of the invention will now be described, by way of example only, with reference to FIGS. 3 to 6, in which.

Throughout the figures, like reference numerals are used to denote like features.

DETAILED DESCRIPTION

A method of starting an internal combustion engine of a vehicle from an eco-stop condition according to an embodiment of the invention will now be described.

In the present embodiment the internal combustion engine has eight cylinders arranged in two banks of four with the two banks arranged at an angle with respect to each other to form a 'V' shape (a 'V8 engine'). There is a common crankshaft for pistons of each bank of cylinders as known in the art.

During operation of the engine, fuel is injected into the cylinders and combusted to force the pistons down and rotate the crankshaft. Each cycle of fuel injection and combustion takes two full revolutions of the crankshaft. For a given cylinder, the first revolution comprises an intake stroke (piston descending) for taking in air, and a compression stroke (piston ascending) for compressing an air/fuel mixture before ignition. The second revolution starts with an ignition spark and comprises a power stroke (piston descending) for combusting the fuel and forcing the piston downwards, and an exhaust stroke (piston ascending) for expelling exhaust gasses. The full cycle (intake, compression, power and exhaust) is continually repeated during operation of the engine. The pistons of each bank of cylinders are disposed at 90° intervals with respect to one another. Accordingly, the positions of the eight pistons are staggered so that during the course of a single engine cycle, eight regular power strokes are delivered by the respective pistons to the common crankshaft.

At a given moment during operation of the engine, four of the cylinders are in the intake or compression strokes and the other four cylinders are in the power or exhaust strokes. Since fuel injections may take place in the intake and compression strokes, it is convenient to represent fuel injection patterns with reference to a single revolution represented by a circle. Points on the circle are used to represent the instant at which, during the first revolution, fuel is injected. A snapshot of the positions of the four pistons in the intake and compression strokes at any one moment can also be represented by four points on the circle spaced at 90° intervals.

Figure 1:
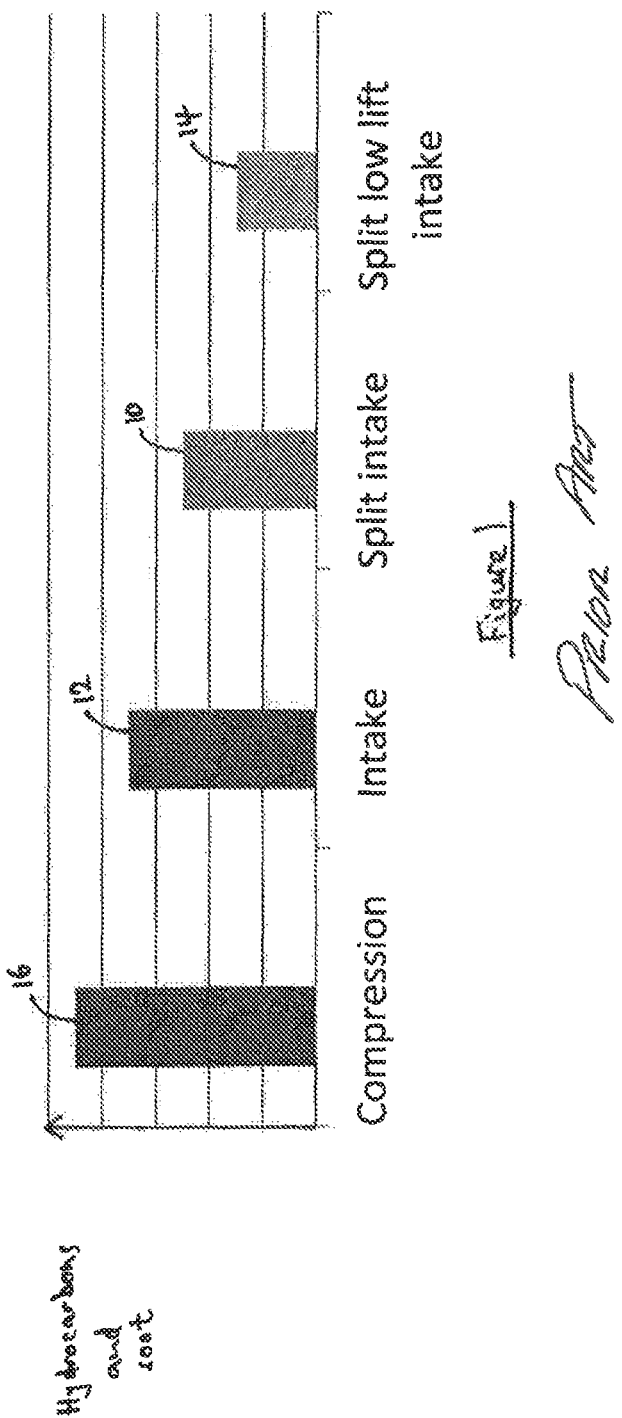
FIG. 1 is a bar chart showing relative quantities of engine emissions of hydrocarbons and soot resulting from different fuel injection patterns of the prior art, as described above.
Figure 2A:
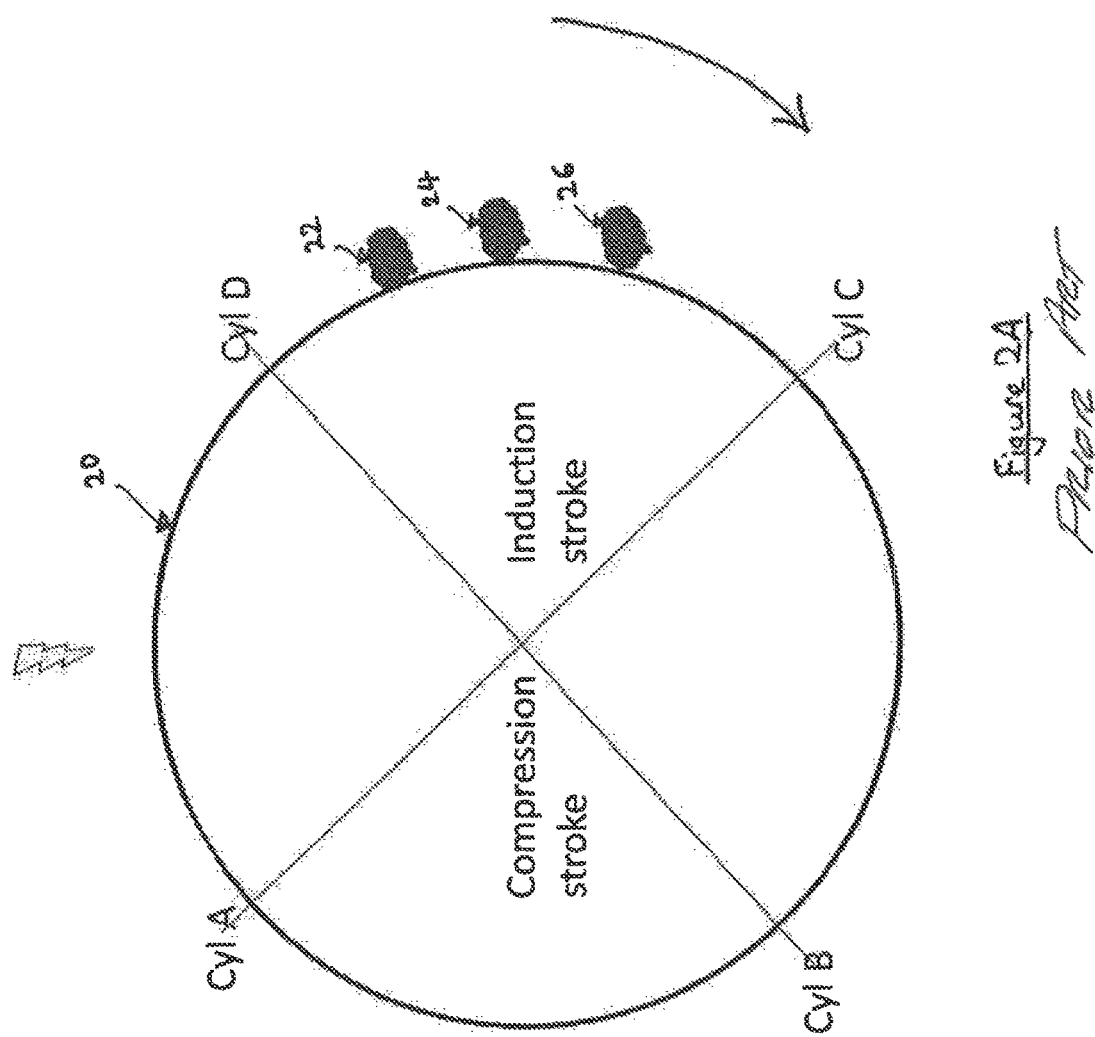
FIG. 2A is a schematic illustration of a split intake injection pattern of the prior art, as described above.
Figure 2B:
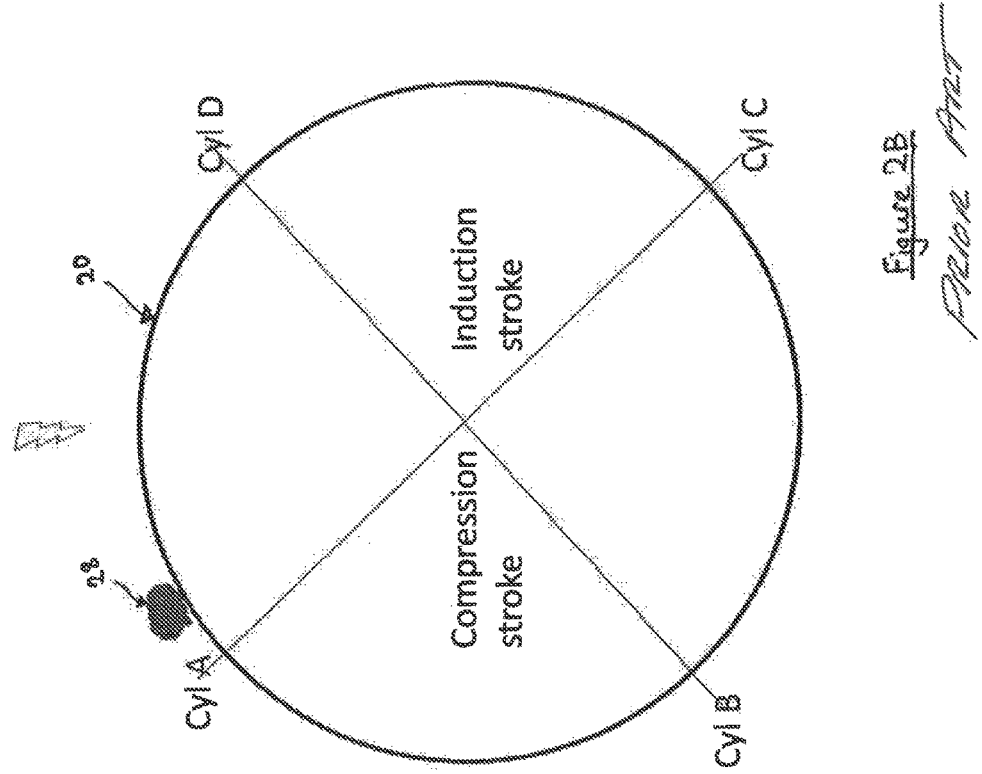
FIG. 2B is a schematic illustration of a compression injection pattern of the prior art, as described above.
Figure 3:
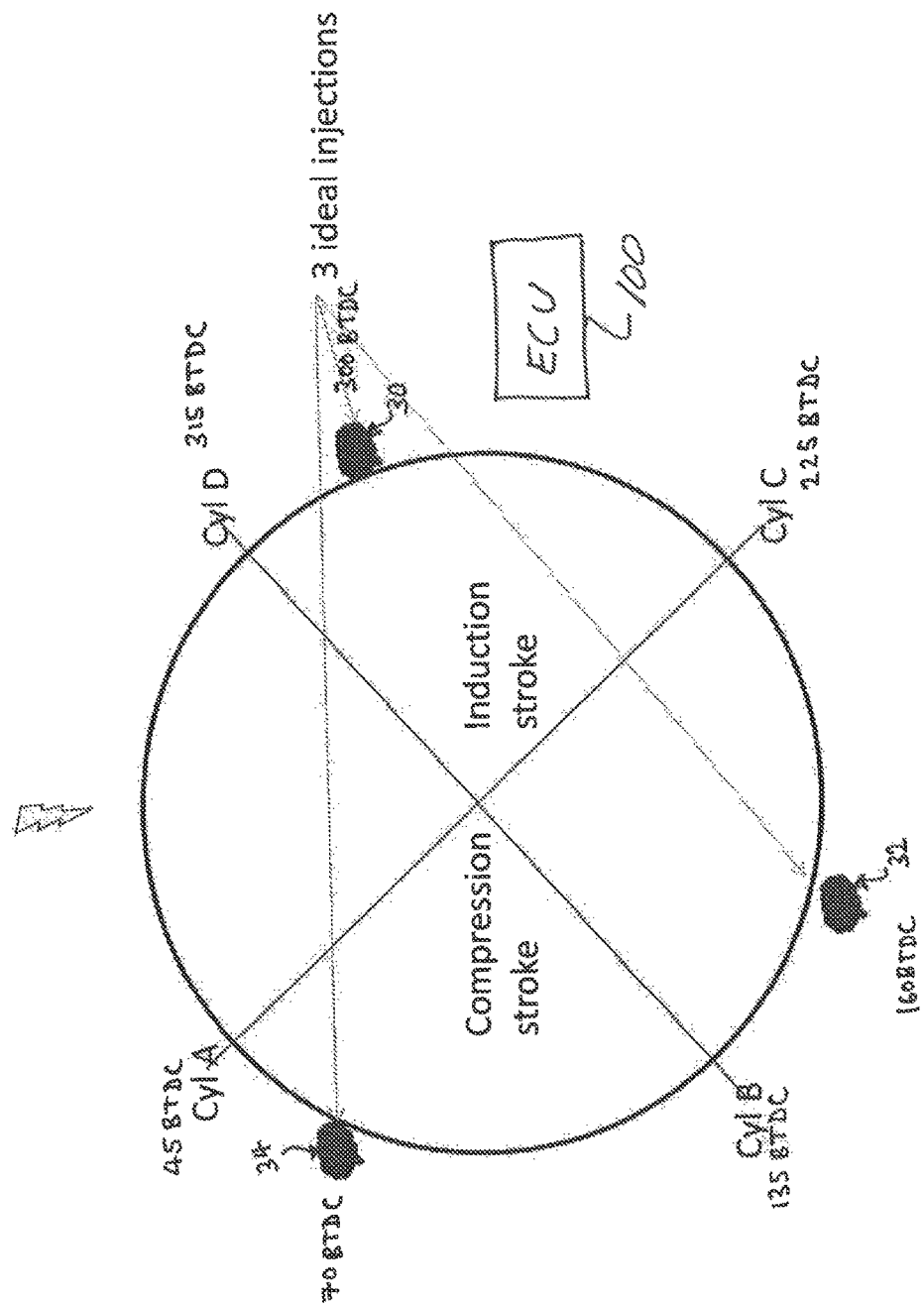
FIG. 3 is a schematic illustration of an optimum injection pattern for use in a method according to an embodiment of the invention.

A representation of this kind is provided in FIG. 3. Referring to FIG. 3, an optimum injection pattern for minimising emissions from the engine is shown.

The optimum injection pattern takes the form of a split injection pattern comprising three injections 30, 32 and 34. It can readily be seen that the first injection 30 indicated on the right-side of the circle is delivered during the intake stroke. The second and third injections 32 and 34 are on the left-side of the circle and are delivered during the compression stroke. This arrangement splits the injection of the total amount of fuel for one cylinder in one cycle three ways and spreads the three injections out over a period defined by a predetermined crank angle, thereby promoting vaporisation of the fuel in the cylinder before the ignition spark for an efficient combustion resulting in low emissions.

The timing of the fuel injections may be expressed by way of the piston position in the revolution before the ignition spark (which is delivered at the top of the circle at the 12 o'clock position). That is, the timings of the fuel injections may be expressed as the number of degrees before 'top dead centre' ('degrees BTDC'). Using this language, the first injection 30 is delivered at 300 degrees BTDC (or '300BTDC'). The second and third injections 32 and 34 are delivered at 160BTDC and at 70BTDC, respectively.

FIG. 3 also shows the relative positions of the four cylinders in the intake and compression strokes. As shown, the four cylinders are 90 degrees apart from each other, with two cylinders (cylinders A and B) in the compression stroke and two cylinders (cylinders C and D) in the intake stroke. The piston of cylinder A is positioned at 45BTDC, with the pistons of cylinders B, C and D following at 135BTDC, 225BTDC and 315BTDC, respectively.

After the moment represented by FIG. 3, cylinder A cycles through 45 degrees before reaching top dead centre. Cylinder B cycles through part of the compression stroke to a position of 70BTDC at which point it receives the third injection 34. Cylinder C cycles out of the intake stroke and into the compression stroke during which it receives the second and third injections 32 and 34 at positions of 160BTDC and 70BTDC, respectively. Finally, cylinder D cycles within the intake stroke to receive the first injection 30 at 300BTDC before cycling into the compression stroke where, like cylinder C, it receives the second and third injections 32 and 34 at positions of 160BTDC and 70BTDC, respectively.

In the present embodiment this optimum injection pattern may be applied to all cylinders for normal operation of the engine after the engine has undergone a start-up phase. The optimum injection pattern provides efficient fuel combustion and minimises emissions from the engine. Furthermore, in the present embodiment the engine may be operated to reach the optimum injection pattern starting from an eco-stop condition in which the engine is automatically stopped during the course of a drivecycle to save fuel, as described in more detail below.

With the vehicle initially in an eco-stop condition the engine is started quickly according to the present embodiment whilst reducing the generation of harmful emissions such as hydrocarbons and soot and carbon monoxide and other unwanted gasses.

In the eco stop condition the driver holds the vehicle in a stationary condition by means of a brake pedal which applies disc brakes to the wheels. In this condition the engine is automatically stopped by the vehicle to save fuel. When the driver releases the brake pedal the disc brakes continue to be applied automatically by the vehicle and the engine is restarted. Once the engine has restarted, the transmission is connected to the engine to transmit torque to the wheels and the disc brakes are released.

According to the presently described embodiment, during the start-up phase a "blended" fuel injection pattern is adopted which enables the engine to be started quickly whilst avoiding the generation of high levels of unwanted/undesirable emissions. The fuel injection pattern is a "blended" pattern in the sense that the start-up phase involves the adoption of more than one fuel injection pattern by different cylinders.

In the present embodiment, the optimum injection pattern is applied to each individual cylinder as soon as possible in dependence on the starting position of its piston. For example, if a piston of a cylinder is positioned at or before the first injection 30 of the optimum injection pattern, an Engine Control Unit (ECU) 100 comprising a processor configured to control fuel injection or suitable control means of the vehicle will cause the cylinder to adopt the optimum injection pattern from the beginning of the start-up phase. If the piston is positioned after the first injection 30 of the optimum injection pattern, the ECU will cause the cylinder to adopt an alternative injection pattern in dependence on the starting position of its piston. This arrangement is described below with reference to FIGS. 3, 4, 5 and 6.

With reference to FIG. 3, cylinder D is positioned sufficiently early in the cycle to receive the all the injections 30, 32 and 34 of the optimum injection pattern. As a result, the ECU causes this cylinder to adopt the optimum injection pattern from the beginning of the start up phase. This helps the vehicle to reduce emissions during the start up phase. As shown in FIG. 3, cylinder D cycles from a starting position of 315BTDC, early in the intake stroke, towards 300BTDC where it receives the first injection 30. Cylinder D then cycles into the compression stroke where it receives the second injection 32 at 160BTDC, and finally towards the latter part of the compression stroke where, at 70BTDC, it receives the third injection 34 in readiness for an ignition spark at top dead centre.

By contrast to cylinder D, cylinders A, B and C have missed the first injection 30 of the optimum injection pattern. As a result, each of cylinders A, B and C is injected according to an alternative injection pattern in which the missed fuel is injected immediately at the beginning of the start-up phase. This enables the missed injection to be delivered, but it is delivered 'late'. Any subsequent injections of the optimum injection pattern have not been missed and consequently may be delivered to a cylinder at their normal, predefined points in the cycle. Thus, cylinders A, B and C are each injected according to a blended or hybrid injection pattern consisting of a 'late' injection which is delivered as soon as possible—i.e. at the beginning of the start-up phase—followed by subsequent injections of the optimum injection pattern at their normal times.

Figure 4:
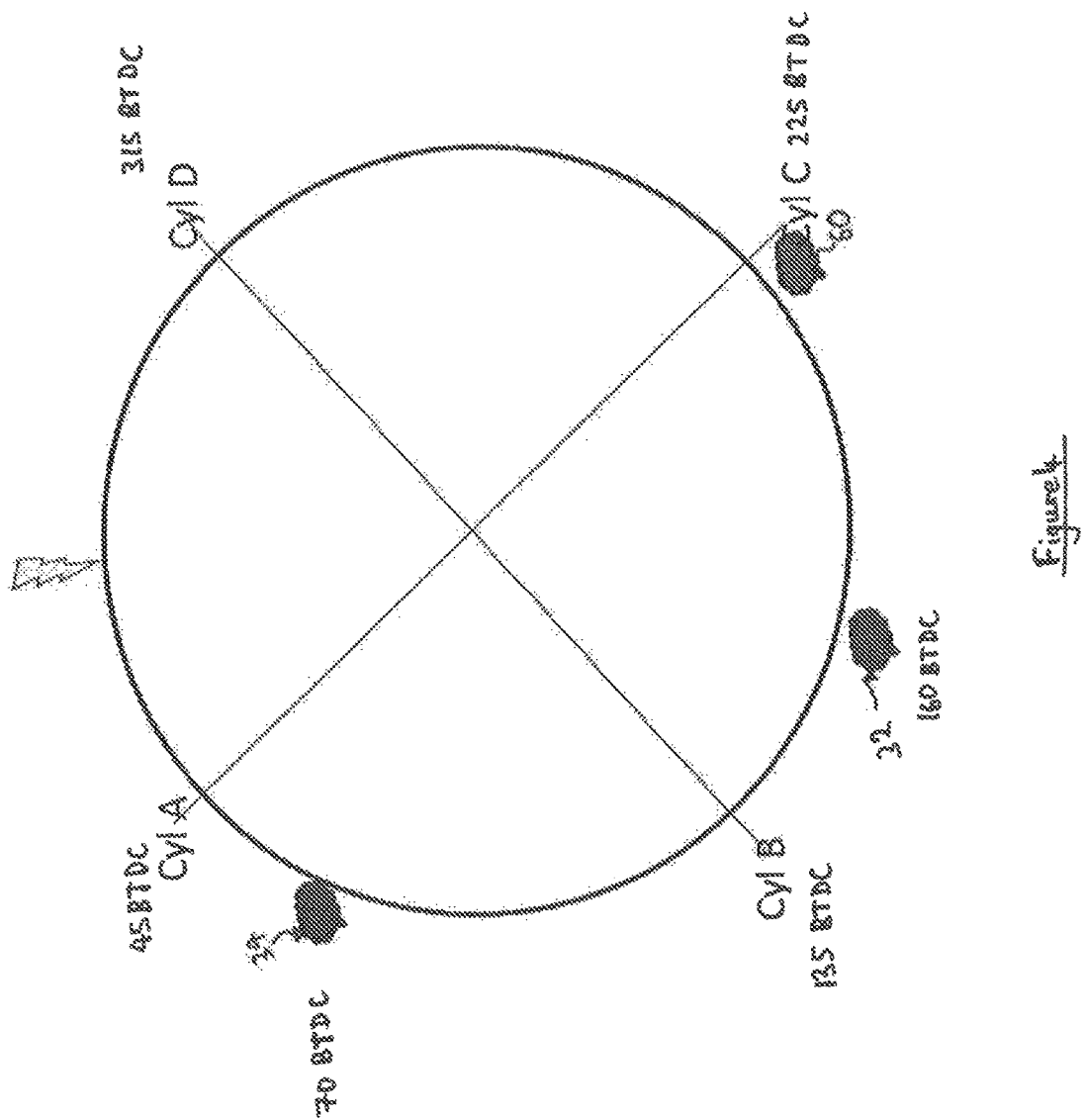
FIG. 4 is a schematic illustration of a missed-fuel injection pattern for application to a cylinder C of an internal combustion engine in accordance with the method referred to above in relation to FIG. 3.

With reference to FIG. 4, as the start-up phase begins, cylinder C is positioned at 225BTDC and has missed the first injection 30. The ECU causes cylinder C to adopt an injection pattern having one 'late' injection 60 upon initial engine cranking followed by second and third injections 32 and 34 'on-time'—i.e. at 160BTDC and 70BTDC, respectively.

If a cylinder has missed more than one injection of the optimum injection pattern, missed fuel accounting for the missed injections is delivered at the beginning of the start-up phase, either for example as a single injection of missed fuel or as a series of repeated injections. Thereafter any subsequent injections of the optimum injection pattern are delivered at their normal times.

Figure 5:
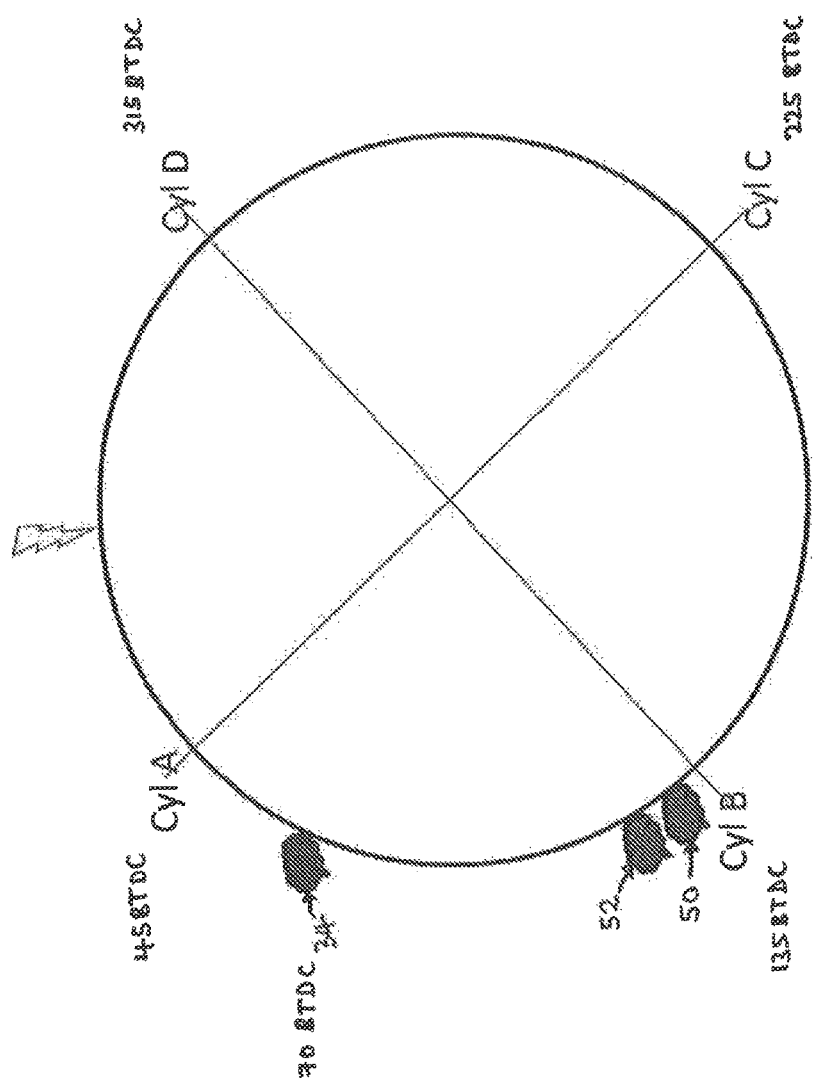
FIG. 5 is a schematic illustration of a missed-fuel injection pattern for application to a cylinder B of the internal combustion engine of FIG. 3 in accordance with the method referred to above in relation to FIG. 3.

Referring to FIG. 5, cylinder B has missed two injections. Cylinder B is initially positioned at 135BTDC and has missed the first and second injections 30 and 32, which would have been delivered at 300BTDC and 160BTDC respectively. As a result, in the present embodiment the ECU causes cylinder B to receive two injections 50 and 52 of missed fuel shortly after 135BTDC during initial engine cranking whilst the cylinder is in the compression stroke. Later in the compression stroke the piston of cylinder B arrives at 70BTDC and receives the third injection 34 at the scheduled position of 70BTDC. It will be appreciated that this injection pattern, involving two 'late' injections 50 and 52 followed by one 'on-time' or 'scheduled' injection 34, is tailored to cylinder B in dependence on its position as the start phase commences. It will be further appreciated that since cylinder B is further ahead in the cycle than cylinder C, cylinder B receives an ignition spark and transitions to the optimum injection pattern before cylinder C.

Figure 6:
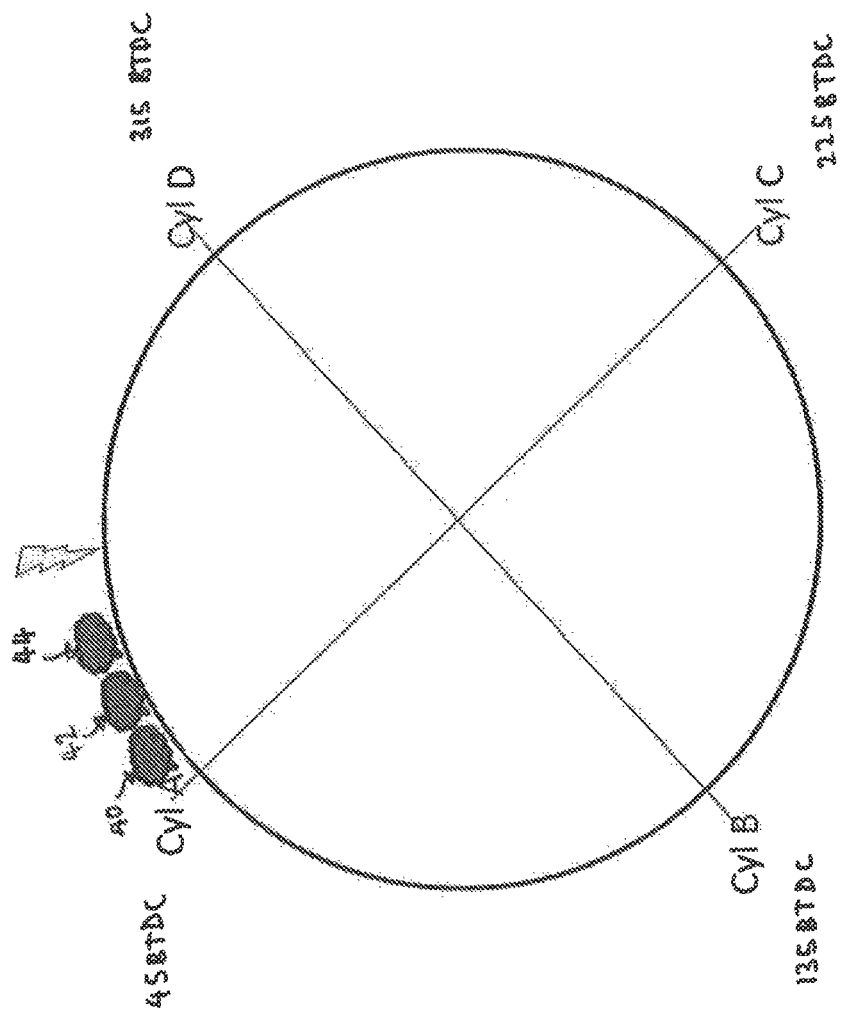
FIG. 6 is a schematic illustration of a missed-fuel injection pattern for application to a cylinder A of the internal combustion engine of FIG. 3 in accordance with the method referred to above in relation to FIG. 3.

Referring to FIG. 6, at the beginning of the start-up phase cylinder A is positioned at 45BTDC and has missed all three injections 30, 32 and 34. As a result, all three injections 30, 32 and 34 need to be accounted for upon initial engine cranking by way of one or more 'late' injections of missed fuel. In accordance with the present embodiment these missed injections are accounted for by providing three injections 40, 42 and 44 of missed fuel to cylinder A upon initial cranking of the engine. As shown in FIG. 6, these injections 40, 42 and 44 of missed fuel are provided in close succession late in the compression stroke, shortly before the cylinder receives an ignition spark at top dead centre.

It will be appreciated that at the commencement of the start-up phase, cylinders A, B and C receive fuel simultaneously during initial cranking of the engine. In an alternative embodiment, it may be the case that hardware or software scheduling limitations require the initial injections at the commencement of the start-up phase to occur sequentially, i.e. be spaced apart.

It will be appreciated that all of the cylinders A, B, C and D have different injection patterns for the first revolution of the engine in dependence on the position of their respective pistons at the beginning of the start-up phase. At one extreme, cylinder D adopts the optimum injection pattern, whilst at the other extreme cylinder A receives all its fuel as a single (or split) late compression stroke injection in the compression stroke shortly before the ignition spark. In between the two extremes fuel is injected increasingly 'late' in the cycle compared with the optimum injection pattern, and fuel is injected increasingly in the compression stroke.

With increased use of the compression stroke for injecting fuel, especially the later parts of the compression stroke, the efficiency of the subsequent combustion is decreased and the level of emissions is increased. In order to mitigate this effect, the amount of fuel injected into each cylinder may be reduced in dependence on how 'late' in the cycle the missed fuel is injected compared with when it would have been injected according to the optimum injection pattern. For example, referring to the injection pattern for cylinder B shown in FIG. 5, injection 50 is effectively a late version of the first injection 30 shown in FIG. 3. Injection 50 is delivered at least 165 degrees after the first injection 30 in the cycle, and may be reduced by a corresponding amount in order to reduce unburnt fuel leading to higher emissions.

By targeting an optimum injection pattern whilst allowing 'late' injections of missed fuel, the above-described embodiment enables an engine to be started quickly enough for an eco-start whilst avoiding the high emissions associated with the compression injection patterns traditionally used for an eco-start. Reducing the quantity of fuel injected for 'late' injections also contributes to the reduction of emissions in the above-described embodiment.

It will be appreciated that cylinders having different initial fuel injection patterns will transition to the optimum injection pattern in sequence following firing at TDC. Each cylinder adopts the optimum injection pattern as soon as possible. As a result, at a given moment during the course of the start-up phase some of the cylinders will have adopted the optimum injection pattern while others will have adopted an alternative initial injection pattern. This is to say that during the start-up phase the engine as a whole adopts a hybrid fuel injection pattern because more than one injection pattern is used.

It will be appreciated by the person skilled in the art that in the presently described embodiment the engine is a V8 engine having a further four cylinders, not shown in FIGS. 3-6, which are in the power and exhaust strokes during the start-up phase. These further four cylinders receive fuel according to the optimum injection pattern when they arrive at the intake stroke in the same way that cylinder D receives fuel.

In the above-described embodiment of the invention a split optimum injection pattern is used with the fuel being split into three injections 30, 32, 34 at different points in the cycle. It is to be appreciated that other embodiments of the invention may use a different optimum injection pattern comprising either a split injection pattern or a single injection. Regardless of the number of injections or the position of the injections in the cycle, this embodiment always targets the optimum injection pattern whilst allowing 'late' injection of missed fuel.

It will be appreciated that the invention is suitable for other starting strategies. For example, in accordance with a further embodiment the invention may be applied to reinstate fuel following overrun fuel cut.

It will be appreciated by a person skilled in the art that the invention could be modified to take various alternative forms to those described herein, without departing from the scope of the appended claims. For example, a hybrid fuel injection strategy could be adopted according to the invention in which an optimum injection pattern is always targeted but for cylinders that have missed the first injection of the optimum injection pattern a compression injection pattern is applied.

Further aspects of the present invention are set out in the following numbered paragraphs;
1. A method of injecting fuel into an internal combustion engine comprising a plurality of cylinders, each of which has an associated piston, the method comprising simultaneously applying different injection patterns to at least two of the cylinders in dependence on initial positions of their respective pistons.
2. A method according to paragraph 1, comprising:
   injecting a first cylinder of the internal combustion engine according to an optimum injection pattern, and, simultaneously,
   injecting a second cylinder of the internal combustion engine according to a start-up injection pattern.
3. A method according to paragraph 2, comprising:
determining, from among the plurality of cylinders, a group of first cylinders comprising one or more cylinders and a group of second cylinders comprising one or more cylinders, wherein determining the respective groups of first and second cylinders is performed in dependence on an initial position of the piston associated with each respective cylinder.
4. A method according to paragraph 3, comprising injecting each of the second cylinders according to a start-up injection pattern, the start-up injection pattern being determined for each respective second cylinder in dependence on the initial position of the piston associated with each second cylinder respectively.
5. A method according to paragraph 2, wherein the start-up injection pattern of the or each second cylinder comprises at least one late injection of missed fuel.
6. A method according to paragraph 5, wherein, following the at least one late injection of missed fuel, the start-up injection pattern of the or each second cylinder comprises delivering at least one injection corresponding to an injection of the optimum injection pattern.
7. A method according to paragraph 5, wherein the missed fuel is delivered by a plurality of separate injections.
8. A method according to paragraph 5, wherein an amount of missed fuel for late injection is reduced in dependence on how late it is injected.
9. A method of starting an internal combustion engine comprising injecting fuel according to the method of paragraph 1.
10. A method according to paragraph 9, including delivering injections of fuel to more than one of the cylinders during initial engine cranking.
11. A method according to paragraph 9, including delivering injections of fuel to more than one of the cylinders when the engine is stationary.
12. A method according to paragraph 10, wherein the delivering of injections of fuel to more than one of the cylinders during initial engine cranking or when the engine is stationary comprises delivering injections of fuel to more than one of the cylinders substantially simultaneously.
13. A method according to paragraph 9, in which the internal combustion engine is started from an eco-stop condition.
14. A method of reinstating fuel into an internal combustion engine, the method including injecting fuel according to a method according to paragraph 1.
15. A method according to paragraph 14, comprising delivering fuel injections substantially simultaneously to more than one of the cylinders of the internal combustion engine.
16. An engine control unit operable to control the injection of fuel in an internal combustion engine in accordance with a method according to paragraph 15.
17. A vehicle comprising an internal combustion engine and an engine control unit according to paragraph 16.

The invention claimed is:
1. A method of injecting fuel into an internal combustion engine utilizing direct fuel injection, the engine including a plurality of cylinders, each of which has an associated piston, the method comprising:
   simultaneously applying different injection patterns to at least two of the cylinders in dependence on initial positions of the associated pistons;
   injecting a first cylinder of the internal combustion engine according to a target injection pattern; and, simultaneously,
   injecting a second cylinder of the internal combustion engine according to a start-up injection pattern;

wherein the start-up injection pattern of the second cylinder is determined in dependence on the target injection pattern of the first cylinder and the initial position of the piston associated with said second cylinder and wherein the start-up injection pattern of the second cylinder comprises at least one late injection of missed fuel relative to the target injection pattern.

2. A method according to claim 1, comprising transitioning said second cylinder from the start-up injection pattern to the target injection pattern within one revolution of a crankshaft of the engine.

3. A method according to claim 2, comprising:
determining, from among the plurality of cylinders, a group of first cylinders comprising one or more cylinders and a group of second cylinders comprising one or more cylinders,
wherein determining the respective groups of first and second cylinders is performed in dependence on an initial position of the piston associated with each respective cylinder.

4. A method according to claim 3, comprising injecting each of the second cylinders according to a start-up injection pattern, the start-up injection pattern being determined for each respective second cylinder in dependence on the initial position of the piston associated with each second cylinder respectively.

5. A method according to claim 1, wherein, following the at least one late injection of missed fuel, the start-up injection pattern of the second cylinder comprises delivering at least one injection corresponding to an injection of the target injection pattern.

6. A method according to claim 1, wherein the missed fuel is delivered by a plurality of separate injections.

7. A method according to claim 1, wherein an amount of missed fuel for late injection is reduced in dependence on how late it is injected.

8. A method according to claim 1, wherein an amount of missed fuel is determined in dependence on an amount of fuel associated with the target injection pattern.

9. A method of starting an internal combustion engine comprising injecting fuel according to the method as claimed in claim 1.

10. A method according to claim 9, including delivering injections of fuel to more than one of the cylinders during initial engine cranking.

11. A method according to claim 9, including delivering injections of fuel to more than one of the cylinders when the engine is stationary.

12. A method according to claim 10, wherein the delivering of injections of fuel to more than one of the cylinders is during initial engine cranking or when the engine is stationary and comprises delivering injections of fuel to more than one of the cylinders substantially simultaneously.

13. A method according to claim 9, in which the internal combustion engine is started from an eco-stop condition.

14. A method of reinstating fuel into an internal combustion engine, the method including injecting fuel according to the method of claim 1.

15. A method according to claim 14, comprising delivering fuel injections substantially simultaneously to more than one of the cylinders of the internal combustion engine.

16. An engine control unit operable to control the injection of fuel in an internal combustion engine in accordance with a method according to claim 1.

17. A vehicle comprising an internal combustion engine and an engine control unit according to claim 16.

18. A method according to claim 1, wherein the target injection pattern is a split injection pattern comprising three injections.

* * * * *